United States Patent
Hyatt et al.

(10) Patent No.: US 7,156,006 B2
(45) Date of Patent: Jan. 2, 2007

(54) METHOD AND ASSEMBLY FOR ROTATING A CUTTING INSERT DURING A TURNING OPERATION AND INSERTS USED THEREIN

(75) Inventors: Gregory A. Hyatt, Youngstown, PA (US); Linn R. Andras, Ligonier, PA (US); Ted R. Massa, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 56 days.

(21) Appl. No.: 10/653,712

(22) Filed: Sep. 2, 2003

(65) Prior Publication Data
US 2005/0047885 A1 Mar. 3, 2005

(51) Int. Cl.
*B23C 1/00* (2006.01)

(52) U.S. Cl. .............................. 82/1.11; 82/131; 407/11; 407/113; 407/114; 407/109; 407/50; 279/8; 409/165

(58) Field of Classification Search .................. 407/11, 407/33, 30, 40–42, 48, 50, 103, 108, 109, 407/107, 113; 82/1.11, 11, 118, 131; 279/8; 409/165, 167
See application file for complete search history.

(56) References Cited

U.S. PATENT DOCUMENTS

| | | | |
|---|---|---|---|
| 2,206,770 A | | 7/1940 | Drummond |
| 2,551,167 A | | 5/1951 | Rolland |
| 3,037,264 A | * | 6/1962 | Mossberg ..................... 407/11 |
| 3,299,491 A | | 1/1967 | Hall |
| 3,656,377 A | * | 4/1972 | Kosem ........................ 82/1.11 |
| 3,925,868 A | * | 12/1975 | Singh ........................ 407/104 |
| 4,024,777 A | | 5/1977 | Fogarty |
| 4,178,818 A | | 12/1979 | Yascheritsyn et al. |
| 4,233,866 A | | 11/1980 | Thomas |
| 4,477,211 A | | 10/1984 | Briese |
| 4,720,216 A | | 1/1988 | Smith |
| 4,824,300 A | | 4/1989 | Pomikacsek |
| 5,014,581 A | | 5/1991 | Komanduri et al. |
| 5,224,404 A | | 7/1993 | Kono et al. |
| 5,431,514 A | * | 7/1995 | Saito et al. .................. 409/132 |
| 5,478,175 A | | 12/1995 | Kraemer |
| 5,607,263 A | * | 3/1997 | Nespeta et al. ............... 407/61 |
| 5,658,100 A | | 8/1997 | Deiss et al. |
| 5,674,032 A | | 10/1997 | Slocum et al. |
| 5,759,086 A | * | 6/1998 | Klingel ........................ 451/28 |
| 5,810,518 A | * | 9/1998 | Wiman et al. .............. 407/102 |
| 6,073,524 A | | 6/2000 | Weiss et al. |
| 6,146,060 A | * | 11/2000 | Rydberg et al. .............. 407/40 |

(Continued)

FOREIGN PATENT DOCUMENTS

CS 275 407 2/1992

(Continued)

OTHER PUBLICATIONS

Rotating-insert tools for machining CGI, by Jairam Manjunathaiah, PhD, Research and New Product Development, Lamb Technicon Machining Systems, Warren, Michigan, Machine Shop Guide, 2002.

(Continued)

*Primary Examiner*—Monica Carter
*Assistant Examiner*—Sara Addisu
(74) *Attorney, Agent, or Firm*—John J. Prizzi (57) ABSTRACT

A cutting insert rotated about its axis may be utilized during a metalworking operation and applied against the rotating workpiece to enhance tool performance. A method, including an assembly with a rotatable insert mounted to a toolholder may be utilized to achieve this result.

4 Claims, 9 Drawing Sheets

U.S. PATENT DOCUMENTS

| | | | |
|---|---|---|---|
| 6,453,782 B1* | 9/2002 | Yamazaki et al. | 82/118 |
| 6,502,487 B1 | 1/2003 | Yamazaki et al. | |
| 6,503,027 B1* | 1/2003 | Men | 407/33 |
| 6,626,614 B1* | 9/2003 | Nakamura | 408/59 |

FOREIGN PATENT DOCUMENTS

| | | |
|---|---|---|
| DE | 3 9 36 539 | 5/1991 |
| EP | 0 506 978 A | 10/1992 |
| EP | 0 796 689 A | 9/1997 |
| EP | 1 325 785 | 7/2003 |
| FR | 1 065 881 | 5/1954 |
| GB | 603 968 A | 6/1948 |
| GB | 2 057 939 | 4/1981 |
| JP | 06 091406 | 4/1994 |
| JP | 2000 015501 | 1/2000 |
| JP | 2000 024807 | 8/2000 |
| JP | 2002 144112 | 9/2002 |
| WO | WO 99/07507 | 2/1999 |

OTHER PUBLICATIONS

Cutting Temperature and Forces in Machining of High-Performance Materials with Self-Propelled Rotary Tool, Ping Chen, JSME International Journal, Series III, vol. 35, No. 1, 1992.

Old Tool Design Takes Off, Jim Destefani, Manufacturing Engineering, Jan. 2000.

Lei, S. et al, "High-speed machining of titanium alloys using the driven rotary tool," International Journal of Machine Tools & Manufacture 42, May 2002, pp. 653-661.

Shaw, M. et al., "The Rotary Cutting Tool," Cambridge, Mass., Transactions of the ASME, Aug. 1952, pp. 1065-1076.

Venuvinod, P. et al., "Some Investigations into Machining with Driven Rotary Tools," Journal of Engineering for Industry, Nov. 1981, vol. 103, pp. 469-477.

Armarego, E. et al., "Fundamental Studies of Driven and Self-Propelled Rotary Tool Cutting Processes—I. Theoretical Investigation," Int. J. Mach. Tools Manufact. vol. 34, No. 6, pp. 785-801, 1994.

Armarego, E. et al., "Predictive Cutting Model for Forces and Power in Self-Propelled Rotary Tool Turning Operations," The University of Melbourne, Parkville, Victoria, Australia, Recd. on Jan. 9, 1997, pp. 19-24.

Chen, P. et al., "Characteristics of Self-Propelled Rotary Tools in Machining High-Performance Materials," Int. J. Japan Soc. Prec. Eng., vol. 25, No. 4 (Dec. 1991), pp. 267-272.

Wang, Z. et al., "Evaluation of a Self-Propelled Rotary Tool in the Machining of Aerospace Materials," Tribology Transactions, vol. 41 (1998), 2, pp. 289-295.

Nakajima, T. et al., "Synthesis of High Crystalline Carbon-Nitrogen Layered Compounds by CVD Using Nickel and Cobalt Catalysts," PII: S0008-6223(96)00143-1, Carbon vol. 35, No. 2, pp. 203-208, 1997.

With English language Abstract.

* cited by examiner

METHOD AND ASSEMBLY FOR ROTATING A CUTTING INSERT DURING A TURNING OPERATION AND INSERTS USED THEREIN

BACKGROUND OF THE INVENTION

1. Field of the Invention

The invention is directed to metalworking operations and, more particularly, to a method and assembly for rotating a cutting insert about the insert central axis during a metalworking operation. The subject invention is also directed to the cutting insert itself, the assembly with a toolholder and such an insert, and the operation of the assembly.

2. Description of Related Art

During a metalworking operation, such as a turning operation, where a stationary cutting insert is urged against a rotating workpiece, the insert cutting edge acting upon the workpiece is heated by the workpiece until the operation is complete or until the cutting edge begins to break down through a failure mechanism, such as crater wear or plastic deformation. To avoid these modes of failure, and to permit more efficient operation of the cutting insert, in the past, circular cutting inserts have been mounted upon toolholders, such that the cutting inserts were freely rotatable about the insert central axis. A particular cutting insert was then presented to the workpiece and oriented in such a fashion that the rotary motion of the workpiece on, for example, a lathe, imparted to the cutting insert a force acting in a direction tangential to the insert. The motion of the workpiece acted against the cutting insert not only to machine the workpiece but, furthermore, to rotate the circular cutting insert such that the cutting edge of the insert was continuously refreshed. As a result, under ideal conditions, no single segment of the cutting edge experienced prolonged exposure to the workpiece. Furthermore, the cutting edge operated at a lower temperature, thereby allowing greater cutting forces and improved efficiency of the metalworking operation.

This type of spinning insert may exhibit extraordinarily long tool life at remarkable speeds. However, this same spinning insert may fail in an equally dramatic fashion when the cutting conditions change slightly, or when the cartridge bearings, used by the cutting insert for rotation, begin to deteriorate.

U.S. Pat. No. 4,178,818 is directed to a method of cutting solids of revolution by a rotary cutting tool having a circular cutting tip. The cutting insert is secured to a spindle which is mounted with bearings within a housing. Coolant is introduced through the spindle into a wind turbine, thereby imparting rotation to the cutting insert. However, the torque resulting from cutting forces tending to rotate the insert is much higher than that developed by the stream of coolant urging rotation of the cutting insert. Rotation is imparted to the cutting insert primarily by interaction with the workpiece. The purpose of the wind turbine is to enable the circular cutting insert to continue its rotation even during an interrupted cut, at which time there is no contact between the cutting insert and the workpiece to provide frictional rotation. As a result, this cutting insert design depends upon extracting from the rotating workpiece a tangential force to rotate the cutting insert.

A method and assembly are needed capable of rotating a cutting insert about its own axis during a metalworking operation, whereby the speed and direction of rotation is not determined by the rotation of the workpiece itself, but is determined by independent forces acting upon the cutting insert.

SUMMARY OF THE INVENTION

One embodiment of the invention is directed to an assembly comprised of a cutting insert having a central axis extending therethrough, wherein the insert is comprised of a body having a top surface, a bottom surface, at least one side therebetween, and a cutting edge at the intersection of the at least one side and the top surface. The assembly also has a toolholder upon which the cutting insert is mounted, wherein the toolholder is adapted to rotate the insert about the central axis at a predetermined rotational speed.

Another embodiment of the invention is directed to a method wherein with a cutting insert having a body with a top surface, a bottom surface, at least one side therebetween, a cutting edge at the intersection of the at least one side and the top surface, and a central axis extending through the top surface and the bottom surface, the method of machining is comprised of the steps of aligning the insert such that the central axis forms an angle with the longitudinal axis of a rotating workpiece, rotating the insert about the central axis of the insert, and urging the insert against the workpiece to initiate the machining operation.

Another embodiment of the invention is directed to a cutting insert comprised of a body with a central axis extending therethrough and having a top surface, a bottom surface, at least one side therebetween, a cutting edge at the intersection of the at least one side and the top surface, and at least one projection extending from the top surface, positioned apart and radially at equal distances from the central axis and spaced inwardly from the cutting edge to act as chip breakers when the insert, used in a turning operation, is rotated about its central axis and applied against a rotating workpiece.

DETAILED DESCRIPTION OF THE INVENTION

Figure 1:
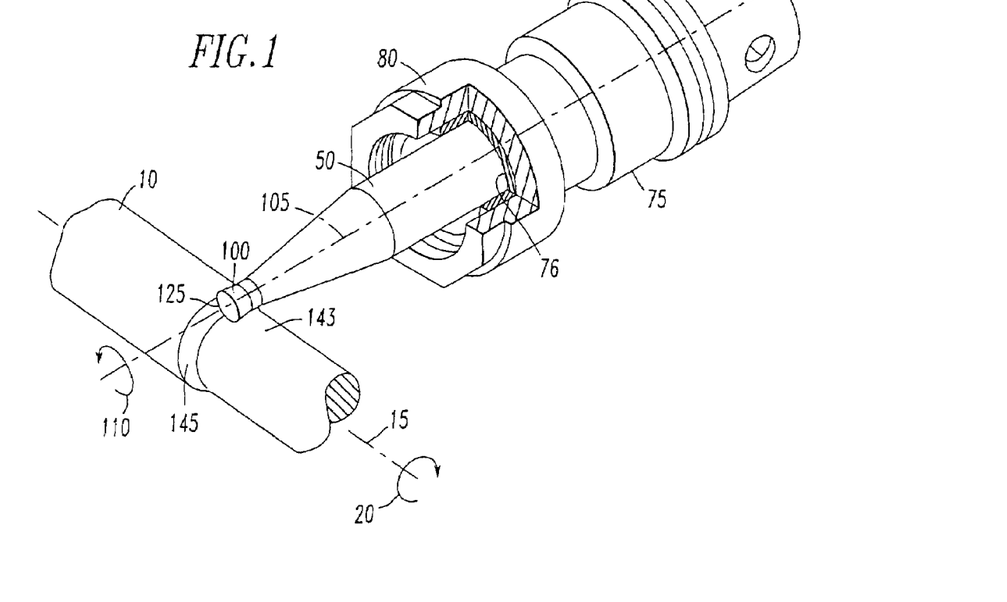
FIG. 1 is a perspective view of a toolholder with a rotatable insert operating upon a rotating workpiece.

FIG. 1 illustrates a workpiece 10 rotating about a centerline 15 in a direction indicated by arrow 20 wherein, for example, the workpiece 10 is mounted upon a lathe. A toolholder 50 has mounted thereupon a cutting insert 100. The cutting insert 100 has a central axis 105. The insert 100 is secured to the toolholder 50 in a non-rotatable fashion such that rotation of the toolholder 50 is translated directly to rotation of the cutting insert 100. As one example, the insert 100 and the toolholder 50 may rotate in the direction illustrated by arrow 110.

Figure 2:
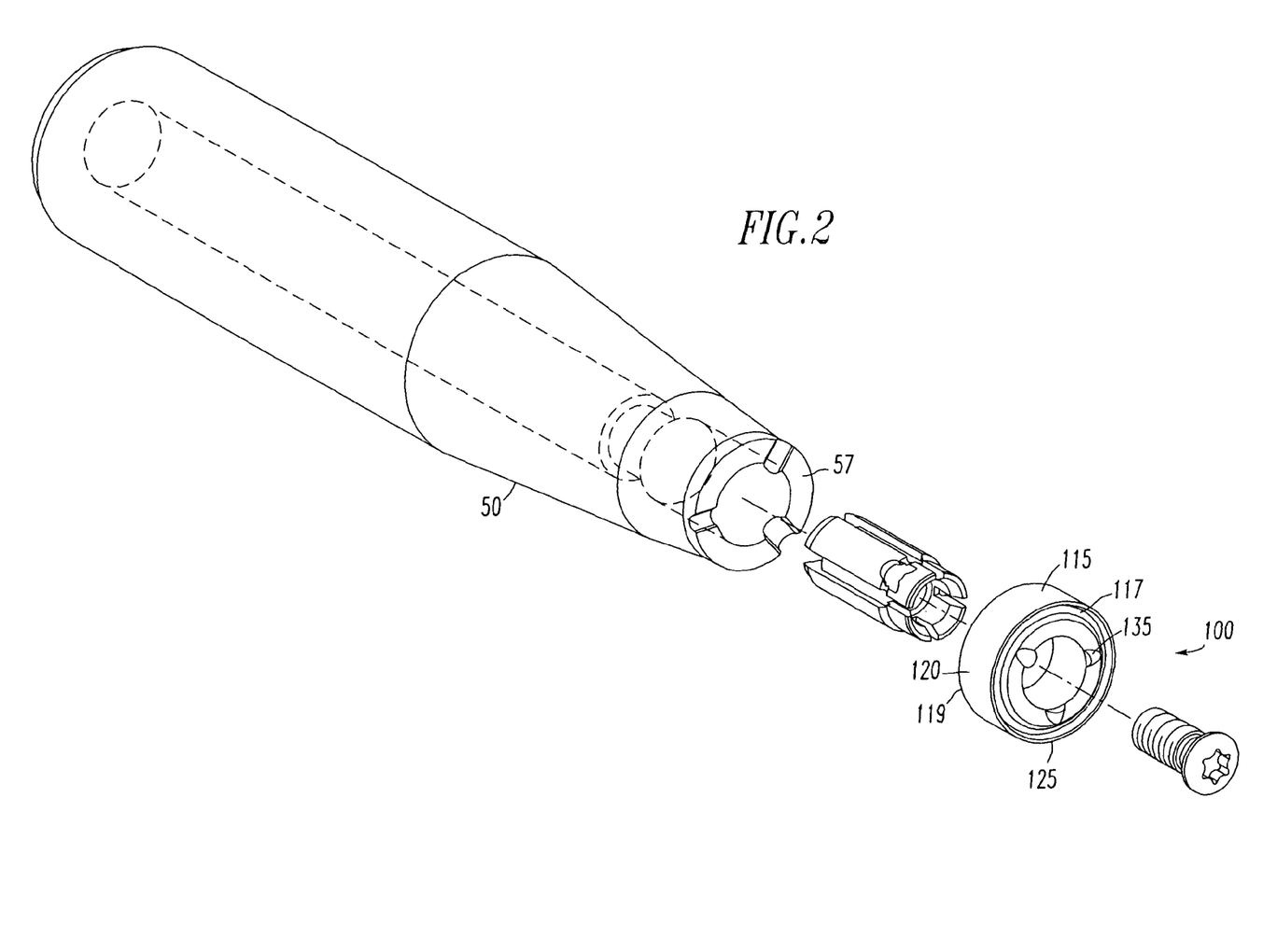
FIG. 2 is a perspective exploded view of a toolholder and the parts associated with securing the cutting insert to the toolholder.
Figure 2A:
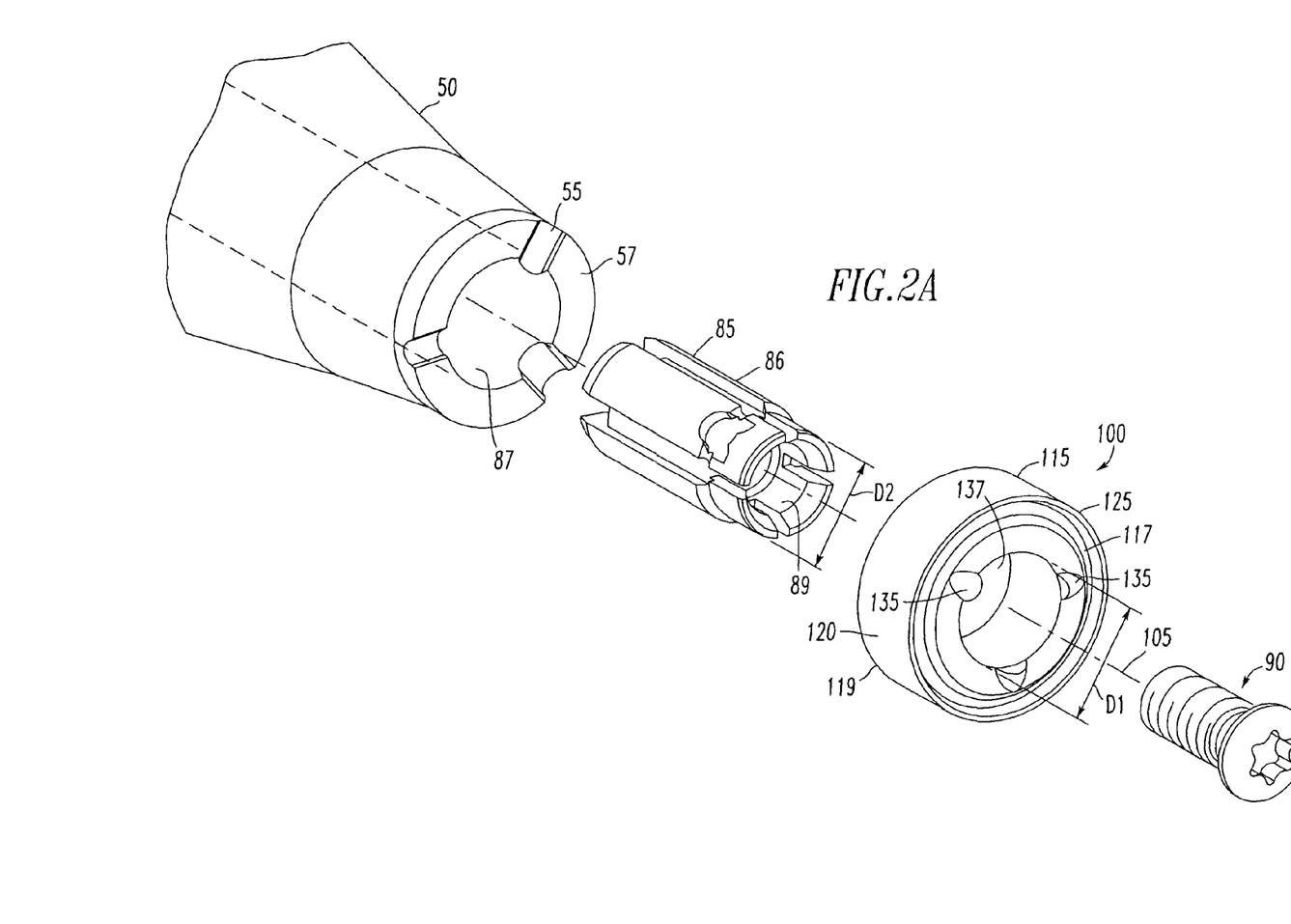
FIG. 2A is an enlarged view of a portion in FIG. 2.
Figure 3:
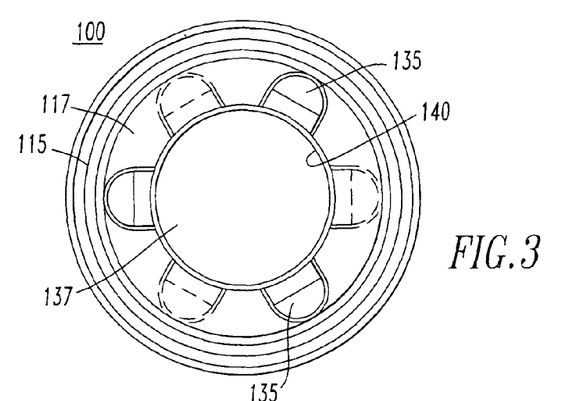
FIG. 3 is a top view of an insert in accordance with the subject invention.
Figure 4:
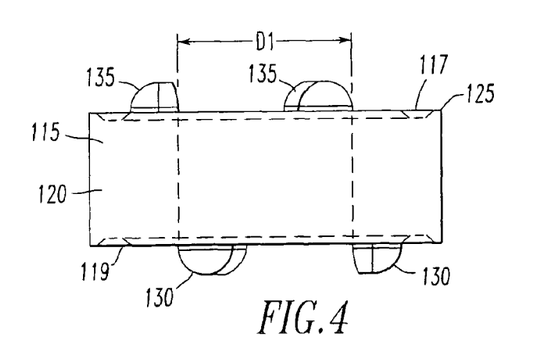
FIG. 4 is a side view of the insert illustrated in FIG. 3.

An assembly is comprised, in part, of the cutting insert 100 with its central axis 105 extending therethrough. The insert, as illustrated in FIGS. 2–4, has a body 115 with a top surface 117 and a bottom surface 119 with at least one side 120 therebetween. A cutting edge 125 is defined at the intersection of the at least one side 120 and the top surface 117. The cutting insert 100 is mounted upon the toolholder 50 and the toolholder 50 is adapted to rotate the insert 100 about the cutting insert central axis 105 at a predetermined rotational speed within a range of between 10 RPM up to the capability of the machine, preferably 60–20,000 RPM and more preferably 250–10,000 RPM. The predetermined rotational speed may be greater than, less than, or equal to the rotational speed of the workpiece 10. The rotational speed of the cutting insert 100 may also be variable during the metalworking operation. Additionally, the speed of the cutting insert 100 may be a function of the speed of the workpiece 10 and may be directly proportional to the speed of the workpiece 10. The rotational speed of the cutting insert 100 may also be completely independent of the rotational speed of the workpiece 10.

Briefly returning to FIG. 1, the toolholder 50 may be secured within a spindle 75 which then would be mounted to a machine tool capable of rotating the spindle 75 in the desired direction and at the desired predetermined rotational speed. The toolholder 50 may be secured within the spindle using any number of techniques known to those skilled in the art of rotary tools. However, as illustrated in FIG. 1, the spindle 75 has an internal bore 76 therein which accepts the toolholder 50 and secures the toolholder 50 within the spindle 75 utilizing a locking nut 80 which is threadably secured to the body of the spindle 75 and urges the toolholder 50 therein. The mechanism for securing the toolholder within the spindle may be one of many different mechanisms, including a collet or a lock screw, and such mechanisms are well known to those skilled in the art of rotating tools.

Figure 1A:
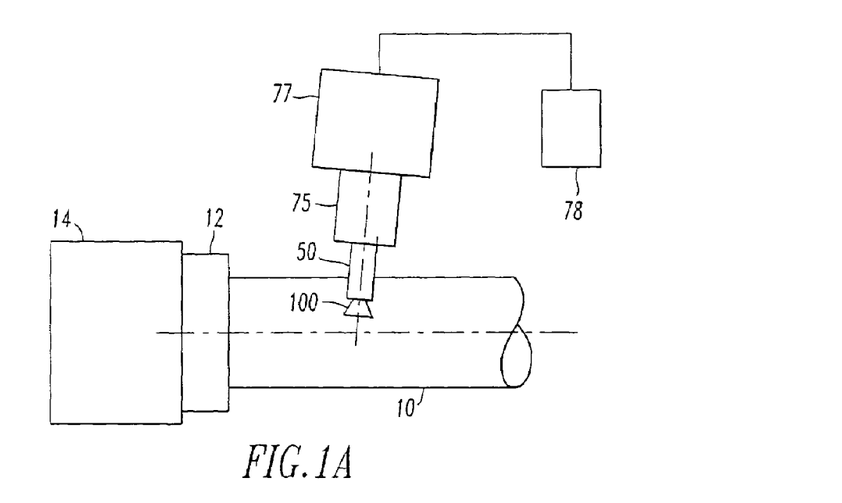
FIG. 1A is a sketch illustrating the toolholder mounted to a rotating spindle and a workpiece positioned upon a lathe.

FIG. 1A shows the toolholder 50 secured within the spindle 75. The spindle 75 is driven by a spindle driver 77. A controller 78, using closed loop feedback from the driver 77, monitors and controls the rotational speed of the spindle 75 and, as a result, of the toolholder 50.

The workpiece 10 may be secured by a chuck 12 to a lathe 14 which rotates the workpiece 10 at a predetermined speed. Through this arrangement, it is possible to rotate the workpiece 10 at a predetermined speed and also to separately rotate the cutting insert 100 at a predetermined speed and to maintain the rotation of the insert 100 at that speed under load. Additionally, it is possible to synchronize the rotation of the insert 100 with the rotation of the workpiece 10. It is a standard practice to include closed loop feedback systems for monitoring and controlling the rotational speed of a workpiece 10 in a lathe 14 or other machine tool.

There are three groups of existing machine tools that could support the spindle 75 in accordance with the subject invention. Each of these groups of machine tools would include closed loop feedback controllers so the rotational speed of the spindle could be closely monitored and controlled. First are the four or more axis machining centers, wherein the toolholder would be secured to and rotated by the spindle. The workpiece would be rotated by the B or C rotary axis and the toolholder would be placed on the center of the rotary axis with the Z axis. The toolholder would be fed in the Y axis to turn a diameter on the workpiece or in the X axis for facing the workpiece.

A second group of machines includes combination turn/mill machines. In the typical nomenclature of these machines, the toolholder would be rotated by the spindle, while the workpiece would be rotated by the spindle in the headstock. The toolholder would then be placed on centerline of the workpiece with the X axis and a facing operation would be performed with the Y axis. Diameters on the workpiece would be turned by feeding in the Z axis.

The third group of potential machines includes conventional two-axis lathes that would be retro-fitted with the spindle to rotate the inserts. This spindle would be mounted approximately mutually perpendicular with the headstock centerline and the X axis, and facing would be performed with X axis motion while turning of diameters of the workpiece would be performed with Z axis motion.

The retrofitted spindle could be driven by a variety of means. An electric servo drive has the advantage of easy integration into the CNC control system and easy programming of spindle rotation speed, while a hydraulic drive has the advantage of a lower cost and provides an extremely robust arrangement in the adverse environment (coolant, swarf, heat, etc.) within the machine tool enclosure.

Directing attention to FIGS. 2–4, the insert 100 is non-rotationally secured to the toolholder 50. In particular, the bottom surface 119 of the cutting insert 100 has one or more projections 130 extending therefrom which are matable with one or more recesses 55 within the face 57 of the toolholder 50. Urging the insert 100 against the face 57 of the toolholder 50 such that the insert projections 130 engage the toolholder recesses 55 and provide a positive coupling between the insert 100 and the toolholder 50 for rotationally securing the cutting insert 100 to the toolholder 50.

The cutting insert 100 further includes one or more projections 135 on the top surface 117 that may be identical to the projections 130 on the bottom surface 119 such that the insert 100 may be invertable and may be positively driven by the toolholder 50 in either position.

Figure 5:
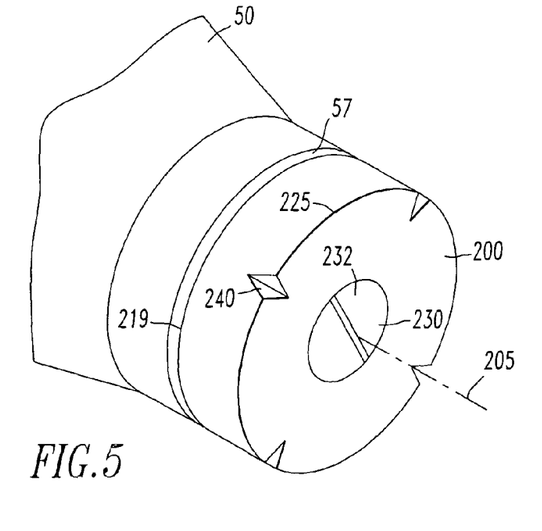
FIG. 5 illustrates a perspective view of a cutting insert having peripheral notches and secured to the toolholder with a screw.

Directing attention to FIG. 5, a cutting insert 200 may be secured to the face 57 of the toolholder 50 by purely frictional forces between the bottom surface 219 of the insert 200 and the face 57 of the toolholder 50. The cutting insert 200 may be frictionally urged against the toolholder 50 utilizing a mounting screw 230 having a head 232 larger than a bore (not shown) extending along the central axis 205 through the insert 200. The mounting screw 230 is threadably secured to the toolholder 50. In this fashion, the cutting insert 200 is urged against the toolholder 50 to create a friction coupling between the insert 200 and the toolholder 50 for transmitting rotation of the toolholder 50 to the cutting insert 200.

The cutting inserts, in accordance with the subject invention, may be made of any materials typically utilized in a metalworking operation, including steel, cemented carbide, cermet, ceramic, PCBN (polycrystalline boron nitride), PCD (polycrystalline diamond) and diamond, each of which may or may not have coatings to improve performance. The selection of the material and/or coatings used for the cutting insert depends upon the workpiece material and the cutting conditions.

As previously discussed in the Background of the Invention, in the past, freely rotating inserts have been mounted to toolholders and the rotation of the workpiece provided a tangential force upon the insert such that the insert would spin relative to a stationary toolholder as the workpiece was rotated, thereby refreshing the cutting insert during the machining operation.

In accordance with the subject invention, the toolholder 50, with the cutting insert 100 secured thereupon, is rotated completely independently of the rotation of the workpiece 10. While the direction of rotation of a freely rotating cutting insert placed against a rotating workpiece is determined entirely by the orientation of the cutting insert and the speed and direction of rotation of the workpiece, the arrangement in accordance with the subject invention is not dependent upon these variables. To the contrary, the arrangement in accordance with the subject invention is capable of rotating the cutting insert 100 clockwise or counterclockwise about the central axis 105 and at any predetermined speed that is desired. In FIG. 1 the direction of rotation of the cutting insert 100 is illustrated by arrow 110 as rotating in the counterclockwise direction. It is entirely possible to change the direction of rotation of the toolholder 50 such that the rotation of the cutting insert 100 is opposite to that illustrated by arrow 110. It is also possible to retain the toolholder 50 to prevent rotation.

By dictating the direction of rotation of the cutting insert 100, it is possible to manage the distribution of temperatures throughout the cutting inserts during a cutting operation. For example, when the insert 100 is rotating in the counterclockwise direction indicated by arrow 110, the cutting edge 125 is permitted to cool as it leaves the workpiece prior to re-entering the shoulder area 145 when the cutting insert 100 experiences its greatest forces and greatest temperatures. On the other hand, if the cutting insert 100 were to be rotated in a clockwise direction (opposite of that shown by arrow 110), then the cutting edge 125 would first begin to contact the workpiece along the reduced diameter portion 143 prior to the shoulder area 145 and would be at least partially heated prior to entering the shoulder area 145 for the most challenging portion of the cutting operation. Therefore, as can be seen, the dynamics of the cutting operation change depending upon the rotational direction of the cutting insert 100 relative to the workpiece 10.

A continuous predetermined rotational speed of the insert 100 promotes uniform heat distribution throughout the insert and, as a result, permits heat dissemination uniformly throughout the insert to minimize thermal gradients which contribute to stresses within the insert body.

The discussion so far has been directed to a cutting insert 100 and a cutting insert 200 having a circular configuration. Such an insert, to the extent that the toolholder 50 is moved parallel to a central axis 15 of the workpiece 10, will produce a machined segment having a circular cross-section. However, it is entirely possible to utilize a cutting insert which has a non-circular cross-section.

Figure 6:
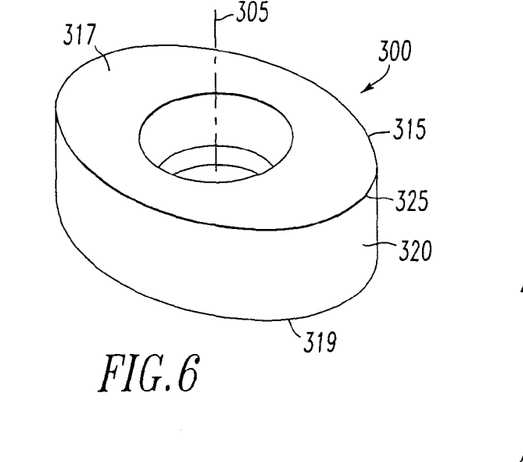
FIG. 6 is a perspective view of an elliptically shaped insert in accordance with one embodiment of the subject invention.

Directing attention to FIG. 6, cutting insert 300 has a body 315 with a top surface 317, a bottom surface 319 and at least one side 320 which intersects with the top surface 317 to define a cutting edge 325. The top surface 317 is non-circular and may be in the form of an ellipse. Just as insert 100 (FIG. 1) is non-rotationally secured to the toolholder 50, so too may cutting insert 300 be non-rotationally secured to toolholder 50 (FIG. 1). It is possible that the shape of the front end of the toolholder 50 must be slightly modified to accommodate the shape of the elliptical insert 300. However, depending upon the cutting loads imparted to the cutting edge 325, the cutting insert 300 may or may not need support along its entire bottom surface 319. Nevertheless, in operation, the rotation of the elliptical cutting insert 300 may be synchronized with the rotation of the workpiece 10 such that the cross-section of the machined workpiece may itself be noncircular. As an example, if the cutting insert 300 were to be rotated about its central axis 305 one complete revolution for every revolution of the workpiece 10, the resulting machined segment of the workpiece 10 would have an elliptical cross-section. On the other hand, if the rotational speed of the elliptical cutting insert 300 was a multiple of the rotational speed of the workpiece 10, then a cross-section of the machined workpiece 10 would have a plurality of waves about a circular profile of the workpiece 10. Such an arrangement may be used to produce ball screws having steep lead threads.

Figure 7:
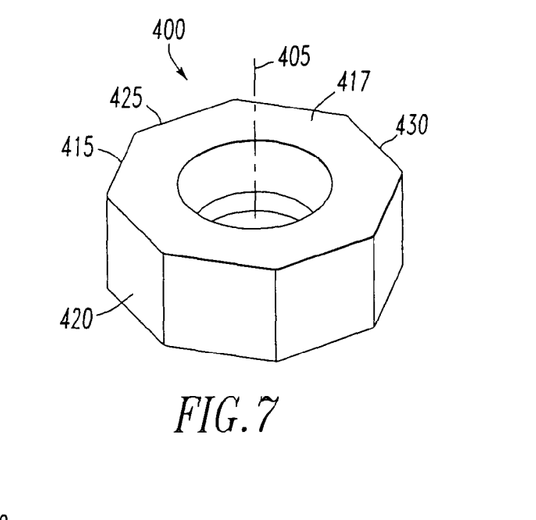
FIG. 7 is a perspective view of an octagonally shaped insert in accordance with one embodiment of the subject invention.

FIG. 7 illustrates a cutting insert 400 that, once again, is non-circular. However, in this design, the cutting insert 400 has a body 415 with a top surface 417 having the general shape of an octagon. The top surface 417 and the sides 420 intersect to define a cutting edge 425 having facets 430. The rotational speed of cutting insert 400 about its central axis 405 may be controlled relative to the rotational speed of the workpiece 10 to provide, for example, a workpiece having an ornamental finish. This geometry may also be useful for chip control.

Depending upon the conditions for a particular metalworking operation, it may be desirable to design the cutting insert with features that will promote formation of small cutting chips from the material removed from the workpiece 10. In particular, directing attention again to FIG. 5, cutting insert 200 may have at least one notch 240 interrupting the cutting edge 225 about the periphery of the insert 200 to provide an interrupted cut to the workpiece. By doing so, the notch 240 will act to sever or help sever any cutting chip that may begin to form. It is entirely possible to have a plurality of notches 240 about the periphery of the cutting edge 225. However, it should be appreciated that the benefits provided in chip control by the introduction of such notches 240 may be applicable only to a roughing operation and, if a relatively smooth surface finish to the workpiece 10 is needed, then such notches 240 may be eliminated in favor of a continuous cutting edge 225.

It is also possible to control the size of cutting chips formed by material removed from the workpiece 10 through the introduction of other chip control features. Directing attention again to FIGS. 2–4, the projections 135 on the top surface 117 of the insert 100 may also function as chip breakers to the extent the depth of cut of the cutting insert 100 is sufficient to permit the chip that is formed during a cutting operation to impinge upon one or more of the projections 135. It is also possible to extend the radial length of a projection 135 such that it is closer to the cutting edge 125. Although the projections 135, when located adjacent to the toolholder face 57, are positioned to non-rotationally secure the cutting insert 100 to the toolholder 50, it may be desirable to extend the projections 135 outwardly in the radial direction, such that chips would be formed during a metalworking operation, when the insert has a smaller depth of cut. Chips would impinge upon one or more of these radially extending projections 135, thereby permitting the projections 135 to act not only as positive rotational locking mechanisms when adjacent to the toolholder face 57, but also to function as chip breakers when facing away from the toolholder face 57.

In general, cutting inserts may be non-rotationally secured to the toolholder 50 using a variety of mechanisms known to those skilled in the art of rotating tooling. One such embodiment is illustrated in FIG. 2A. A collet 85 may be mounted within a bore 87 extending within the toolholder 50 and the insert 100 may be secured to the toolholder 50 through the collet 85. In particular, and with respect to the embodiment illustrated in FIG. 2A, the cutting insert body 115 has a bore 137 extending therethrough along the central axis 105. The bore 137 has an inner wall 140 (FIG. 3), wherein the inner wall 140 has an internal diameter D1 (FIG. 2A). The collet 85 is aligned with the central axis 105 and is non-rotationally secured within and protrudes from the bore 87 of the toolholder 50. The collet 85 may have an internal threaded bore 89 and an outer wall 86 with a maximum external outer diameter D2 (FIG. 2A) less than the insert bore maximum internal diameter D1. A bolt 90 is threadably securable within the collet internal threaded bore 89. Therefore, with the collet 85 mounted within the bore 87 of the toolholder 50, the cutting insert 100 is placed over the collet 85 and the bolt 90 is placed through the bore 137 of the cutting insert 100. The bolt is then threadably engaged with the threaded bore 89 of the collet 85 such that, with the cutting insert 100 mounted over the collet outer wall 86, the insert bore 137 fits over the collet outside wall 86. The bolt 90 is then tightened thereby causing the collet 85 to expand and to secure the collet outer wall 86 against the cutting insert bore inner wall 140. As a result, the cutting insert 100 is nonrotatably secured to the toolholder 50.

The collet 85, illustrated in FIGS. 2 and 2A, has a constant outside diameter D2 to define a circular shape. It should be appreciated that the shape of the collet should not be limited to circular, but any of a variety of non-circular collet shapes may be utilized with the understanding that the inner wall 140 of the cutting insert 100 may have to be modified to accommodate the non-circular shape of another collet. However, details of such an accommodation are well known to those skilled in the art of rotary tools. As an example, the collet may have an outer surface which is elliptical in shape to conform with a cutting insert having an elliptical shape.

While in FIG. 2A collet 85 is removably secured to the toolholder 50, it is possible for the collet 85 to be permanently mounted within or an integral part of the toolholder 50.

Figure 8:
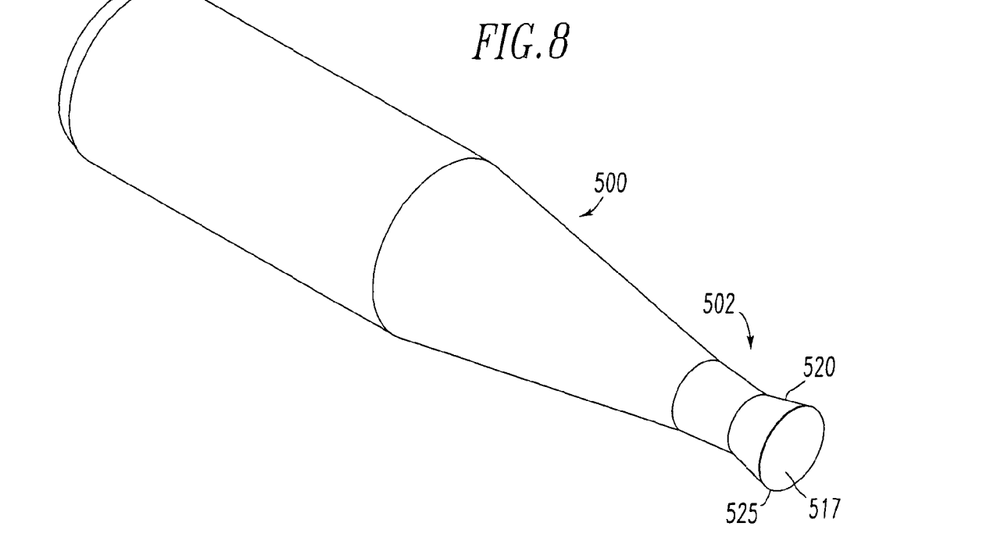
FIG. 8 is a perspective view of a toolholder having an integral end which is shaped to function as a cutting insert.

As illustrated in FIG. 8, the toolholder and cutting insert 500 are one integral piece. The toolholder/cutting insert 500 has all of the same features of the toolholder 50 previously discussed, however, instead of the cutting insert being separate from, but non-rotationally secured, to the end of the toolholder 50, the toolholder 500 has a cutting end portion 502 with a top surface 517 and sides 520 which intersect to form a cutting edge 525. Under these circumstances, the cutting end portion 502 of the toolholder 500 may be repeatedly resharpened, thereby providing an integral toolholder/cutting insert 500 which, absent unexpected damage, would have an exceptionally long tool life.

While so far the removable cutting inserts discussed have been approximately disc shaped, it is possible to utilize differently shaped inserts so long as the top surface, and at least one side of the insert, includes features herein discussed.

Figure 9:
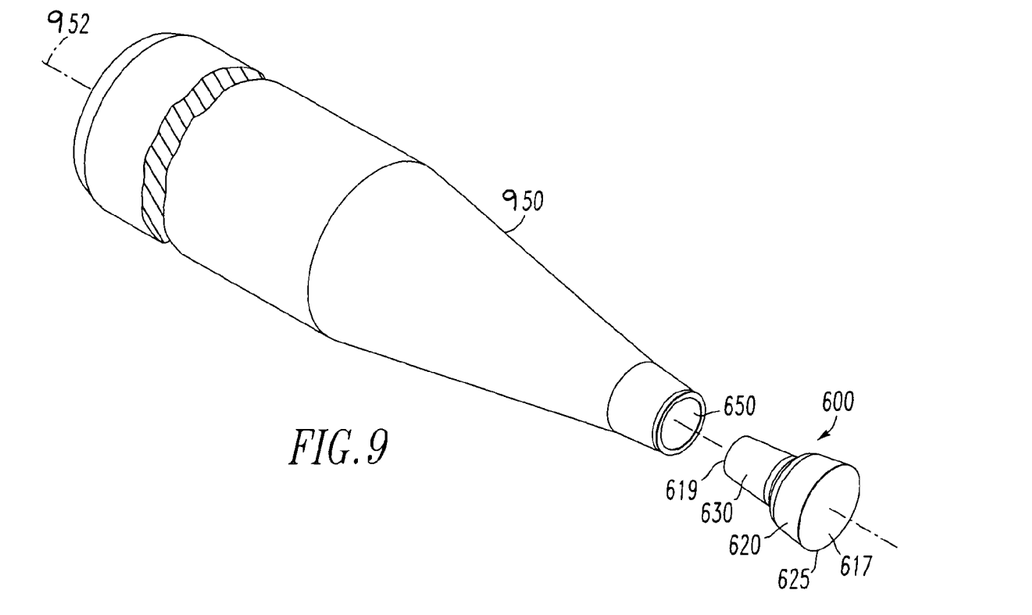
FIG. 9 is an exploded perspective view of a toolholder and a cutting insert having a frusto-conical base matable within the toolholder.

In particular, FIG. 9 illustrates a post-like cutting insert 600 having a top surface 617, a bottom surface 619 and a side 620 which intersects with the top surface 617 to define a cutting edge 625. The insert 600 has a frusto-conical shaped support post 630 which fits in a mating before 650 within the toolholder 900 to form a friction fit between the support post 630 and the mating bore 650. In such a fashion, the cutting insert 600 is nonrotatably retained within the toolholder 950. This arrangement is particularly suited when the force generated upon the insert 600 during a machining operation acts upon the cutting edge 625 to provide a compression force having a component along the toolholder central axis 952.

In the Background of the Invention, the mode of tool failure for non-rotating inserts was identified as crater wear and plastic deformation as a result of the concentration of temperature and forces at one particular location on the cutting edge of the insert. The design, in accordance with the subject invention, while minimizing these failure modes of the metalcutting conditions of the prior art, introduces the possibility of transferring heat so effectively from the cutting insert to the toolholder that the toolholder may be subject to damage through excessive temperatures. Therefore, it may now be desirable to introduce cooling mechanisms for the toolholder.

Figure 10:
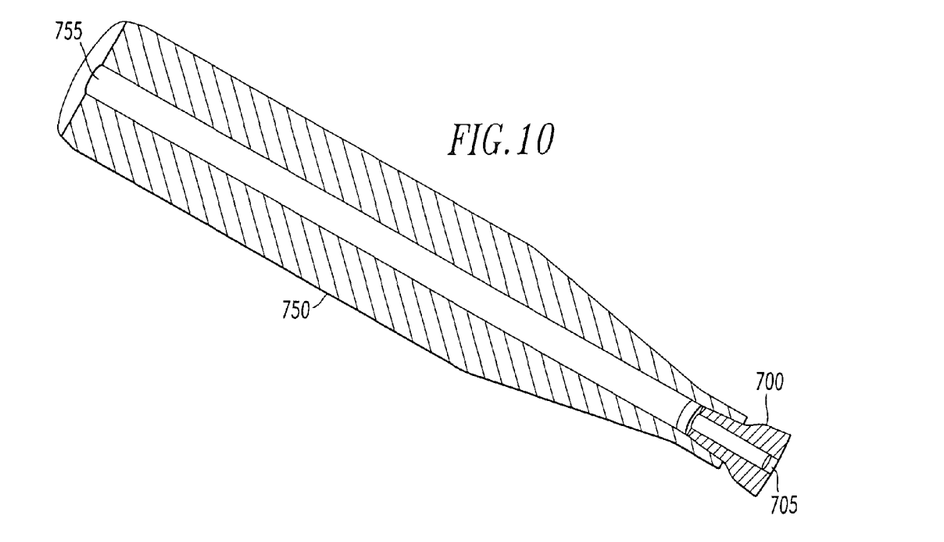
FIG. 10 is a cut-away perspective view of a toolholder with an insert mounted thereupon having a coolant bore extending therethrough.

Directing attention to FIG. 10, a modified toolholder 750 has a bore 755 extending along its length through which coolant may be provided. The associated cutting insert 700 is secured within the bore 755 and itself has a bore 705 which may be co-linear with the bore 755 within the toolholder 750. Coolant introduced during the cutting operation through the bore 755 travels through the bore 705 of the cutting insert 700 and exits in the proximity of the cutting region. In this manner, coolant may be utilized to both cool the cutting region and, furthermore, to cool the toolholder 750 and the cutting insert 700.

Figure 11:
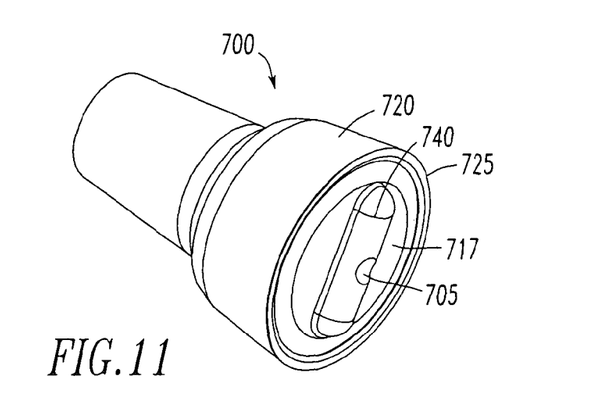
FIG. 11 is a perspective section view of a cutting insert with a chip breaker and with a frusto-conical base.

Details of the insert 700 are shown in FIG. 11. Insert 700 has a top surface 717 and a side 720 which intersect to define a cutting edge 725. The bore 705 extending along the length of the cutting insert 700 is fluidly coupled with the bore 755 of toolholder 750 (FIG. 10). A chip breaker 740 extends across the width of the insert top surface 717 and is used to promote the formation of cutting chips during a metalworking operation in a fashion similar to the projections 130, 135 in FIGS. 3 and 4.

Figure 12:
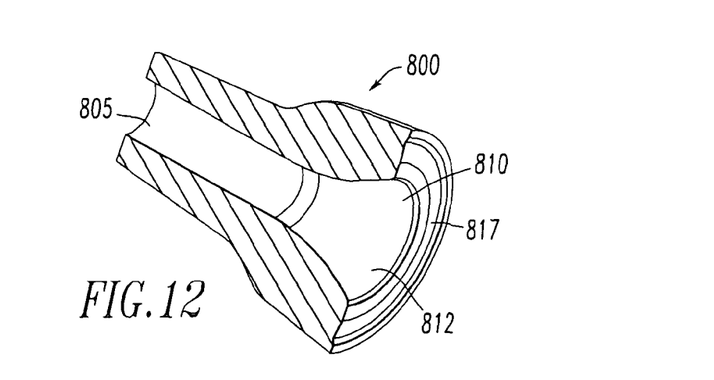
FIG. 12 is a perspective section view of a cutting insert having a coolant bore extending therethrough and a frusto-conical base.

FIG. 10 illustrates a bore 705 having a constant diameter. To better disperse the cooling fluid upon the actual cutting region, as illustrated in FIG. 12, a similar cutting insert 800 may have a bore 805 with an exit portion 810 with an inner wall 812 tapering outwardly as the bore approaches the top surface 817. This generally conically shaped inner wall 812 acts to effectively disperse the cutting fluid through a wider spray area, thereby more effectively cooling the cutting region. In this fashion, heat generated through the cutting operation transferred to the toolholder may be effectively removed while, at the same time, the cooling fluid will act to cool the cutting region.

In addition to providing a bore extending through the toolholder for coolant, it is also possible to select the toolholder of a material that may be resistant to high temperatures. As an example, the toolholder material may be Inconel, or any of a number of other materials that provide sufficient structural rigidity and that are tolerant of high temperatures.

Figure 13:
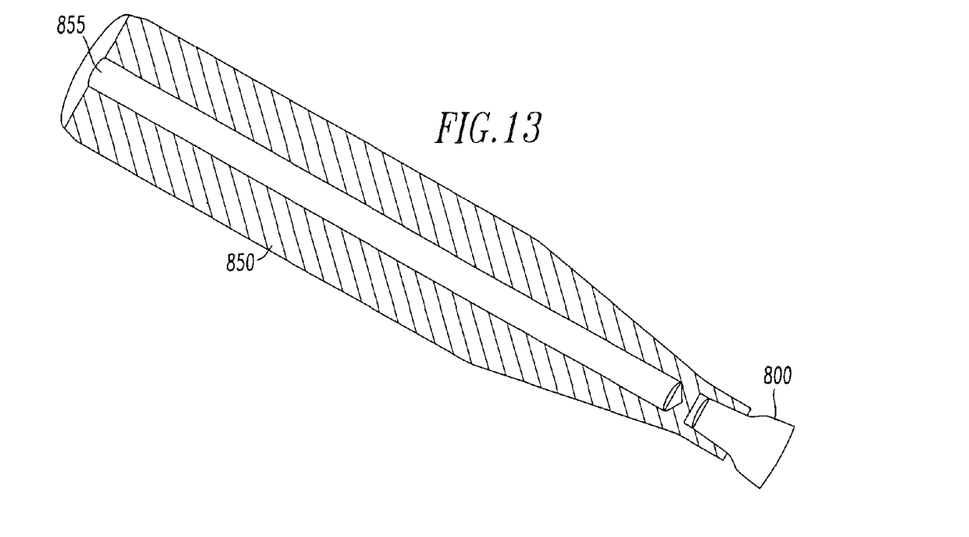
FIG. 13 is a cut-away perspective view of a toolholder with an insert mounted thereupon having a coolant bore extending partially therethrough.

Under circumstances in which a dry cutting operation is required and coolant may not be introduced to the workpiece, it is possible, as illustrated in FIG. 13, to provide a toolholder 850 having a bore 855 extending only partially along the length of the toolholder 850. Coolant introduced within the bore 855, once heated, would have to be circulated with other cooling fluid. Such circulation could be accomplished by maintaining the cutting insert 800 in an elevated position and spraying through the bore 855 coolant fluid which then, by gravity, would return to the opposite end of the toolholder 850. In the alternative, if, for example, the cutting insert 800 was the lowest part of the assembly, then cooling fluid could evaporate and travel to the opposing ends of the bore 855 where it could be cooled and condensed.

Although not illustrated in FIG. 13, it is entirely possible to extend the bore 855 through the entire length of the toolholder 850 and, furthermore, to introduce a bore partially through the cutting insert 800 such that any coolant fluid introduced within the bore 855 would also be introduced within the insert bore to provide cooling to both the toolholder 850 and the cutting insert 800. Just as with the arrangement with the bore 855 extending partially through the toolholder 850, this arrangement with the bore 855 extending partially through the cutting insert and in communication with the toolholder bore would permit the motion of the toolholder to agitate the cooling fluid therein, thereby distributing heat more evenly throughout the toolholder 850 and insert 800 to enhance heat dissipation. It is also possible to utilize an insert similar to insert 800 in FIG. 13 to "plug" the bore extending through the toolholder 750 in FIG. 10.

Figure 14:
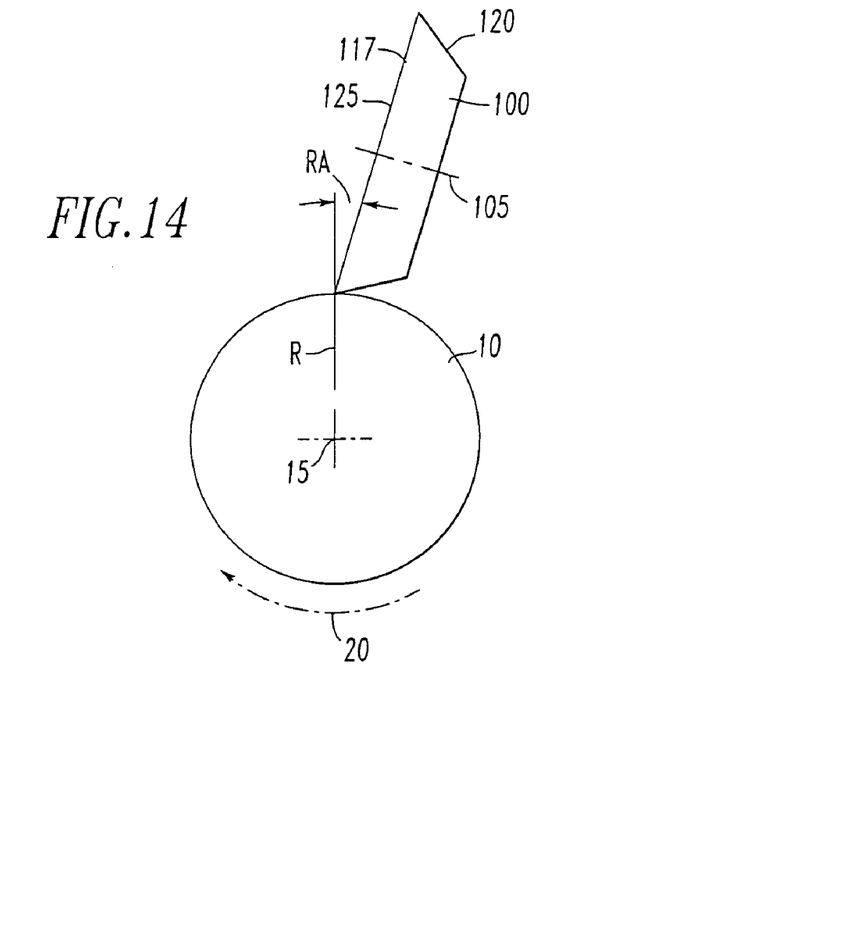
FIG. 14 is a sketch showing, from the end of a rotating workpiece, the orientation of a spinning insert for a turning operation.

Directing attention to FIG. 14, the cutting insert 100 has a top surface 117 with a side 120 which intersects with the top surface 117 to define a cutting edge 125 and may be oriented relative to the workpiece 10 such that the rake angle RA formed at the intersection of the top surface of 117 at the cutting edge 125 and a radial line R extending from the axis 15 of the workpiece 10 is between −10° and 30°, preferably −5° to +15°. In many instances, the will be a land extending inwardly from the cutting edge and the land will be angled to predispose that cutting insert with a positive, neutral or negative rake angle RA. Under these circumstances, the rake angle RA will be a combination of the angle of the land (rake face angle) and the angular orientation of the cutting insert. As indicated in FIG. 14, the workpiece 10 is rotating about the axis 15 in a direction of arrow 20.

Figure 15:
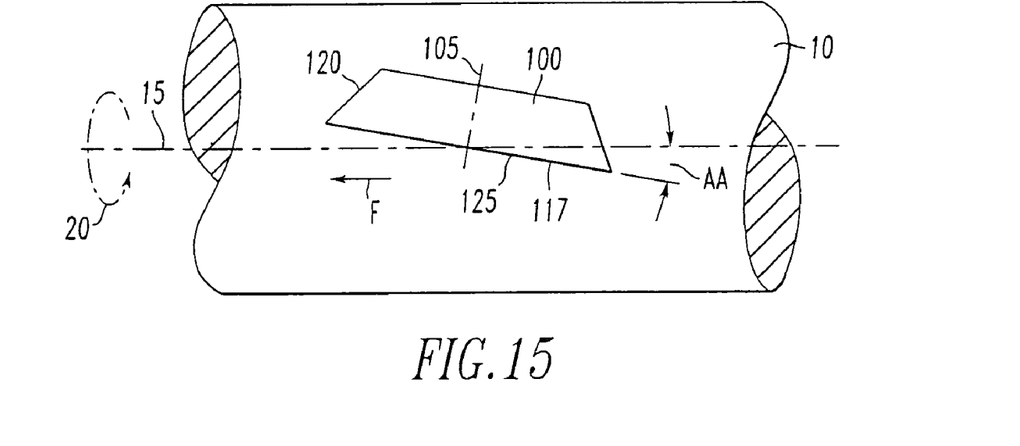
FIG. 15 is a plan view of the arrangement shown in FIG. 14.

Directing attention to FIG. 15, the cutting insert 100 may also be oriented relative to the direction of feed F such that the intersection of the top surface 117 at the cutting edge 125 with the axis 15 of the workpiece 10 forms an axial angle AA at less than 90° and preferably between 0° and 30°. The following examples found in the table illustrate the results of utilizing the assembly in accordance with the subject invention.

A circular insert with a ½ inch IC was secured to a toolholder in a fashion similar to that arrangement in FIG. 9 of the subject invention and mounted within a Mori Seiki MT 253 machine tool. This trial was run under dry conditions. The cutting insert was a KC8050 coated cemented carbide. KC8050 grade is a proprietary grade produced by Kennametal. The workpiece was a log having a starting diameter of approximately 4.9 inches and made of 1040 carbon steel.

TABLE

|  | Example 1 | Example 2 | Example 3 |
|---|---|---|---|
| Surface Speed*** | 525 m/min | 374 m/min | 270 m/min |
| Feed Rate/Revolution | 1.0 mm/rev | 4.0 mm/rev | 1.0 mm/rev |
| Feed Rate/Minute | 1338 mm/min | 3820 mm/min | 688 mm/min |
| Depth of Cut | 1.0 mm | .75 mm | 1.25 mm |
| Rotational Factor* | 4x | 4x | 4x |
| Removal Rate | 525 cm³/min | 1122 cm³/min | 337 cm³/min |
| Life of Insert** | | | |
| (Volume) | 2625 cm³ | 7854 cm³ | 10125 cm³ |
| (Time) | 5 min | 7 min | 30 min |

*Insert spinning at this value times the workpiece RPM
**Time at which flank wear equaled or exceeded 0.015 inches.
***The surface speed was kept constant, which required increasing the rotational speed of the workpiece as the workpiece diameter was reduced.

What has been so far discussed is a toolholder nonrotatably secured within a spindle such that rotation of the spindle translates to rotation of the toolholder, which translates to rotation of the cutting insert. However, this arrangement requires that the spindle be rotated. It is entirely possible, however, to utilize a stationary spindle and an auxiliary drive mechanism, such as a motor mounted upon the spindle, capable of rotating the toolholder within the stationary spindle.

Figure 16:
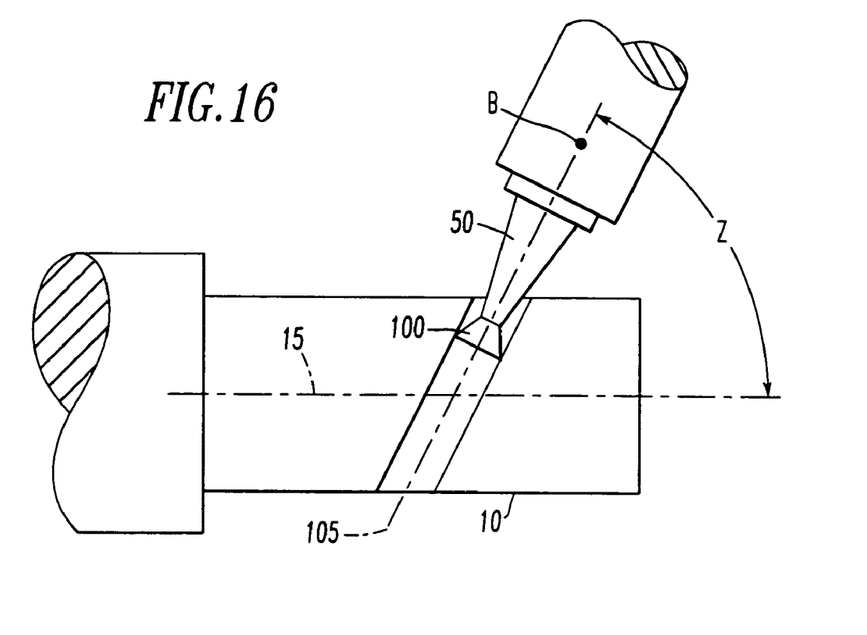
FIG. 16 is a sketch showing, from a plan view, a rotating workpiece and the orientation of a spinning insert for a threading operation.
Figure 17:
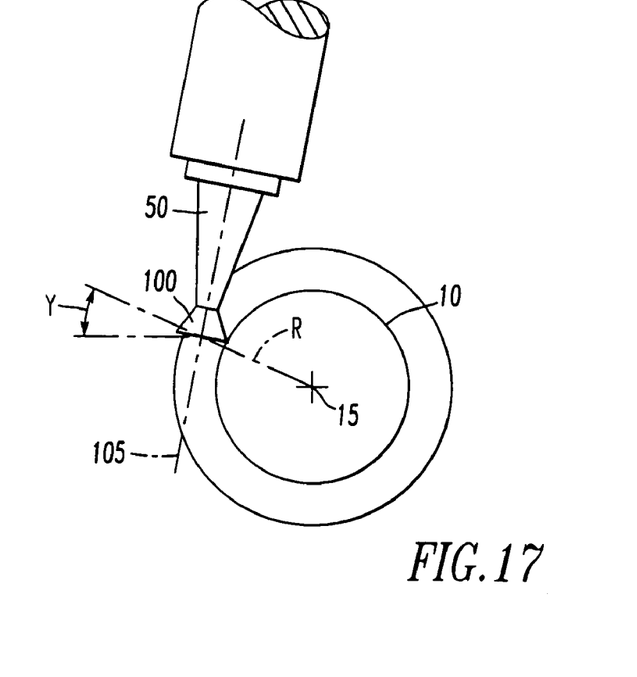
FIG. 17 is an end view of the arrangement shown in FIG. 16.

By utilizing the apparatus of the subject invention it is also possible to machine a workpiece to produce threads, as opposed to the previously described turning operation which removes material across overlapping widths of the workpiece. FIGS. 16 and 17 illustrate an arrangement whereby the workpiece is being machined to form threads. Such a formation requires close synchronization between the feed rate of the insert and the rotation of the workpiece. The insert 100 secured to the toolholder 50 is oriented such that the central axis 105 of the cutting insert 100 forms with the centerline 15 of the workpiece 10 an angle Z. Additionally, a line perpendicular to the central axis 105 of the cutting insert 100 forms a clearance angle Y with a radial line R extending from the workpiece centerline 15.

In one example, the workpiece 10 is made of 4140 alloy steel. The clearance angle Y is 7° and the angle Z is also 7°. The insert 100, which is a ½ inch IC circular insert, is oriented perpendicular to the spindle axis of rotation B. The rotational speed of the workpiece 10 is 100 RPM while the rotational speed of the insert 100 is twice that speed, or 200 RPM. The feed rate of the insert 100 is equal to the desired pitch of the screw thread, which is 3 inches per revolution. The depth of cut is 0.010 inch. Under these circumstances the metal removal rate is 6 in³/min.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. An assembly comprised of:
   a) a cutting insert having a central axis extending therethrough, wherein the insert is intended to machine a workpiece by rotation of the insert about the central axis and wherein the insert is comprised of a body having:
      1) a top surface and a bottom surface;
      2) at least one side therebetween extending around the entire body; and
      3) a cutting edge extending along the entire intersection of the at least one side and the top surface, thereby defining a cutting edge circumference made up of a plurality of adjacent circumferential segments, wherein the cutting edge circumference lies within a single plane;
   b) a rotatable toolholder upon which the cutting insert is mounted, wherein the toolholder is adapted to rotate the insert about the central axis at a predetermined rotational speed and wherein the toolholder is adapted to present to the workpiece in a continuous sequential fashion the adjacent circumferential segments of the cutting edge; and
   c) wherein the insert has an elliptical shape for shaping the workpiece so that it has a non-circular cross-section.

2. An assembly comprised of:
   a) a cutting insert having a central axis extending therethrough, wherein the insert is intended to machine a workpiece by rotation of the insert about the central axis and wherein the insert is comprised of a body having:
      1) a top surface and a bottom surface;
      2) at least one side therebetween extending around the entire body; and
      3) a cutting edge extending along the entire intersection of the at least one side and the top surface, thereby defining a cutting edge circumference made up of a plurality of adjacent circumferential segments, wherein the cutting edge circumference lies within a single plane;
   b) a rotatable toolholder upon which the cutting insert is mounted, wherein the toolholder is adapted to rotate the insert about the central axis at a predetermined rotational speed and wherein the toolholder is adapted to present to the workpiece in a continuous sequential fashion the adjacent circumferential segments of the cutting edge; and
   c) wherein a bore extends within the toolholder and is entirely closed and wherein fluid partially fills the bore such that motion of the toolholder agitates the fluid thereby distributing heat more evenly throughout the toolholder to enhance heat dissipation.

3. With a cutting insert having a body with a top surface and a bottom surface, at least one side therebetween extending around the entire body, a cutting edge extending over the entire intersection of the at least one side and the top surface, thereby defining a cutting edge circumference made of a plurality of adjacent circumferential segments which lie in a single plane, and a central axis extending through the top surface and the bottom surface, a method of machining comprising the step of:
   a) aligning the insert such that the central axis forms an angle with the longitudinal axis of a rotating workpiece;
   b) rotating with a driver the insert about the central axis of the insert at a predetermined speed;
   c) while the insert is being rotated by the driver, urging the insert against the workpiece to initiate the machining operation; and
   d) wherein the top surface of the insert is non-circular and further including the step of synchronizing the rotation of the cutting insert with the rotation of the workpiece to impart to the workpiece a non-circular cross-section.

4. An assembly comprised of:
   a) a cutting insert having a central axis extending therethrough, wherein the insert is comprised of a body having:
      1) a top surface and a bottom surface;
      2) at least one side therebetween; and
      3) a cutting edge at the intersection of the at least one side and the top surface;
   b) a toolholder upon which the cutting insert is mounted, wherein the toolholder is adapted to rotate the insert about the central axis at a predetermined rotational speed;
   c) wherein the bottom surface of the cutting insert has projections extending therefrom which are matable with recesses within the toolholder to provide a positive coupling between the insert and the toolholder when the cutting insert is urged against the rotatable toolholder for rotationally securing the cutting insert to the toolholder and wherein the insert further includes projections on the top surface that are identical to the projections on the bottom surface such that the insert is invertible and may be positively driven by the toolholder in either position.

* * * * *